United States Patent
Saunders (10) Patent No.: US 7,203,489 B2
(45) Date of Patent: Apr. 10, 2007

(54) MEASUREMENT BASED PREDICTION METHOD FOR RADIATION PATH LOSS

(75) Inventor: Simon Saunders, Ash (GB)

(73) Assignee: Cellular Design Services Limited, W. Sussex (GB)

(*) Notice: Subject to any disclaimer, the term of this patent is extended or adjusted under 35 U.S.C. 154(b) by 548 days.

(21) Appl. No.: 10/471,305

(22) PCT Filed: Mar. 8, 2002

(86) PCT No.: PCT/GB02/01063

§ 371 (c)(1),
(2), (4) Date: Sep. 8, 2003

(87) PCT Pub. No.: WO02/073997

PCT Pub. Date: Sep. 19, 2002

(65) Prior Publication Data

US 2004/0116111 A1 Jun. 17, 2004

(30) Foreign Application Priority Data

Mar. 9, 2001 (GB) ................... 0105910.4

(51) Int. Cl.
*H04Q 7/20* (2006.01)
*H04B 17/00* (2006.01)
*G01S 7/40* (2006.01)

(52) U.S. Cl. ............ 455/423; 455/446; 455/67.11; 342/173; 342/174

(58) Field of Classification Search ............ 455/423, 455/446, 67.11; 342/173, 174
See application file for complete search history.

(56) References Cited

U.S. PATENT DOCUMENTS

| 5,574,466 | A | * | 11/1996 | Reed et al. | ........... 342/359 |
| 5,794,128 | A | * | 8/1998 | Brockel et al. | ........... 455/67.11 |
| 5,953,669 | A | | 9/1999 | Stratis et al. | |
| 6,032,105 | A | * | 2/2000 | Lee et al. | ........... 455/67.11 |
| 6,088,522 | A | | 7/2000 | Lee et al. | |
| 6,711,404 | B1 | * | 3/2004 | Arpee et al. | ........... 455/423 |
| 6,834,180 | B1 | * | 12/2004 | Marshall | ........... 455/67.11 |
| 2005/0282540 | A1 | * | 12/2005 | Motamedi et al. | ........... 455/423 |

OTHER PUBLICATIONS

PCT International Search Report PCT/GB 02/01063.
PCT International Preliminary Examination Report PCT/GB 01/01064.
UTD-based model for prediction of progagation path loss and shadowing variability in urban mobile environments.

* cited by examiner

Primary Examiner—Lana Le
Assistant Examiner—Wen Huang
(74) Attorney, Agent, or Firm—Lucas & Mercanti, LLP (57) ABSTRACT

A measurement-based prediction method for radiation path loss over a predetermined area comprises the steps of: determining a received signal strength (2) at least one first station resulting from a transmission of known properties (4, 6) from at least one second station, the first and second stations having known locations; determining radiation path loss data on the basis of the received signal strengths (2) and topographical information (6) of the predetermined area; analyzing the determined radiation path loss data to determine coefficients for a radiation propagation model; applying the radiation propagation model (10) to generate first predicted radiation path loss data at each of the locations of the first stations and over the predetermined area; determining shadowing values on the basis of differences between the received signal strength (2) and the first predicted radiation path loss data at each of the locations of the first stations; analysing the shadowing values to yield shadowing parameters representative of the predetermined area; and generating shadowing predictions over the predetermined area on the basis of the shadowing parameters and combining such shadowing predictions with the first predicted radiation path loss data to generate second predicted radiation path loss data over the predetermined area (22).

26 Claims, 5 Drawing Sheets

MEASUREMENT BASED PREDICTION METHOD FOR RADIATION PATH LOSS

This invention relates to a measurement-based prediction method for radiation, for example radio frequency radiation, path loss.

In the design of wireless systems, particularly but not exclusively for cellular mobile radio, it is usual to commence network design by making predictions of the coverage area of each base station. This is usually accomplished with a planning tool, which is a software system incorporating two main components:

a propagation model which predicts the path loss between base station locations and mobile station locations; and a system simulator which uses the path loss predictions together with a knowledge of system parameters, such as transmit powers and antenna patterns, to predict the received signals and the resulting system performance.

Typical propagation models applied for macrocell (outdoor) mobile wireless systems are empirical. That is, they are based on a mathematical function fitted through a set of measurements at a large number of mobile locations, where the mobile station moves through a number of clutter classes representing the local environment (for example, urban, suburban, rural and the like). The measurements are separated into individual classes and a model is fitted to the path loss measurements in each category. The concepts of propagation modelling are described in more detail in, for example, "Antennas and Propagation for Wireless Communication Systems", S R Saunders, Wiley 1999, ISBN 0-471-98609-7.

The resulting empirical model is then used to make predictions of path loss for other base stations and mobile locations where the mobile station is in the same clutter class as the locations used to derive the model. The model essentially accounts for the impact of "clutter", for example buildings and trees. When there are large obstructions, for example resulting from hills and other terrain features, the loss from these is accounted for in the model by adding a calculated diffraction loss derived from the geometry of the environment and one of a number of possible theoretical approaches.

System design then relies on the accuracy of this model. This approach suffers from a number of disadvantages:

it can only be used with any accuracy over parameter ranges (such as distance, base station height, environment type) included in the original measurement set;

environments must be classified into clutter classes, which are difficult to define precisely;

there is a large degree of scatter of actual measurement points relative to the model used at a given distance and allowance must be made for this scatter when designing the network and has a significant impact on the coverage and capacity of the resulting network;

differences in the geometry and environment around the base station to be predicted compared with that where the original measurements were made can cause even greater errors.

Modern wireless networks require a high degree of precision in their design in order efficiently to use the allocated radio spectrum, which is a costly and scarce resource, and there is therefore a demand for propagation models with higher accuracy.

One approach is to use high resolution geometrical information to describe the environment (such as buildings, terrain, trees and the like). This information is then used as input to an electromagnetic simulator which makes direct physical predictions of signal strengths. This approach can yield high accuracy, but requires considerable expenditure on the basic data and on computation time to run the simulator. Often, for example because electrical parameters of the environment are unknown, measurements are still required to verify and "tune" the results.

It is therefore an object of the present invention to provide a measurement-based method for predicting radiation path loss which overcomes or at least ameliorates the above disadvantages.

According to the present invention there is provided a measurement-based prediction method for radiation path loss over a predetermined area comprising the steps of:

determining a received signal strength at at least one first station resulting from a transmission of known properties from at least one second station, the first and second stations having known locations;

determining radiation path loss data on the basis of the received signal strengths and topographical information of the predetermined area;

analysing the determined radiation path loss data to determine coefficients for a radiation propagation model;

applying the radiation propagation model to generate first predicted radiation path loss data at each of the locations of the first stations and over the predetermined area;

determining shadowing values on the basis of differences between the received signal strength and the first predicted radiation path loss data at each of the locations of the first stations;

analysing the shadowing values to yield shadowing parameters representative of the predetermined area; and generating shadowing predictions over the predetermined area on the basis of the shadowing parameters and combining such shadowing predictions with the first predicted radiation path loss data to generate second predicted radiation path loss data over the predetermined area.

The topographical information may include terrain heights and/or clutter classes.

The transmission properties may be employed in determining the radiation path loss data. The transmission properties may include transmission power and/or antenna radiation pattern and/or (antenna) height.

The determined radiation path loss data may be analysed by an automatic regression procedure.

A single second station and a single first station may be provided with one of the stations optionally being movable. Alternatively, a single second station and multiple first stations may be provided. As a further alternative, multiple first and second stations may be provided, the second stations transmitting at different frequencies.

The determined radiation path loss data may be analysed to determine separate coefficients for each second station.

The shadowing parameters may be determined on the basis of the mean and/or the standard deviation and/or the probability density function of the shadowing values. Where the probability density function is employed, a goodness-of-fit test to a parameterised distribution, such as lognormal, may be employed. The shadowing parameters may additionally be determined on the basis of an auto-correlation between the received signal strengths and the distance between first stations. The shadowing parameters may additionally be determined on the basis of a cross-correlation between the received signal strengths as a function of the ratio of distances between first and second stations and the angle between the paths between the first and second stations.

The shadowing predictions may be generated randomly on the basis of the shadowing parameters and filtered according to the determined shadowing (correlation) values.

The method may include the additional step of merging the determined radiation path loss data with the second predicted radiation path loss data to generate third predicted radiation path loss data over the predetermined area. The third predicted radiation path loss data may be determined by summing the second predicted radiation path loss data and the shadowing predictions. The third predicted radiation path loss data may further be determined by substituting at locations corresponding to the first stations data determined from the received signal strength. Alternatively, the third predicted radiation path loss data may further be determined by substituting at locations corresponding to the first stations a weighted average of the summed data and data determined from the received signal strength. Third predicted radiation path loss data which is not substituted may be filtered to smooth the data.

For a better understanding of the present invention and to show more clearly how it may be carried into effect reference will now be made, by way of example, to the accompanying drawings in which.

GENERAL PROCEDURE

Figure 1:
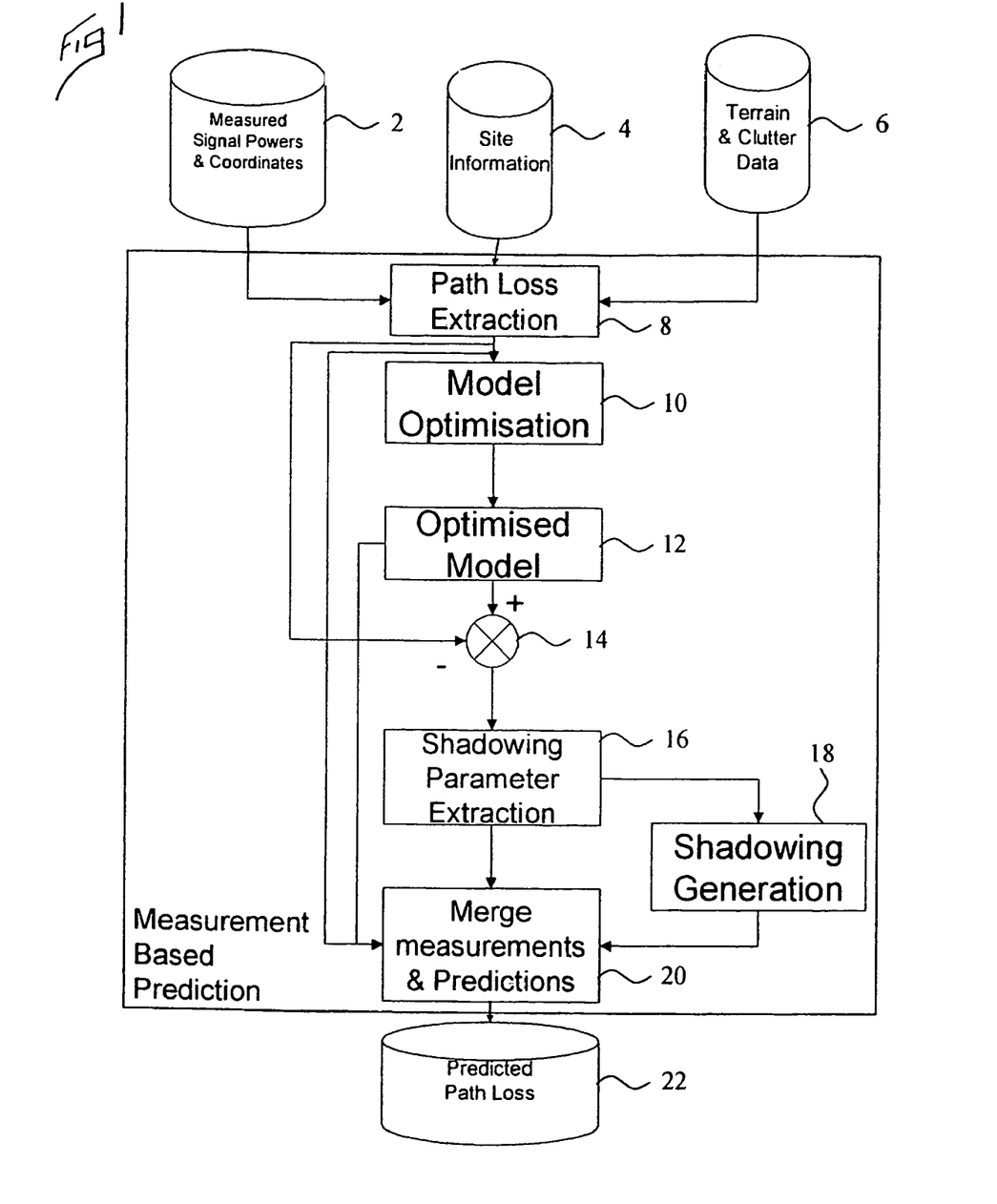
FIG. 1 is a flow diagram schematically illustrating a method of measurement-based prediction according to the present invention.

The flow diagram of FIG. 1 shows three sets of data 2, 4 and 6. Data set 2 is a set of measurements of received signal strength from one or more base stations, each measurement having known geographical co-ordinates. Data set 4 is a set of site information data describing the parameters of the or each base station site used to obtain the measurement data set 2, such as the transmit power, antenna radiation pattern and height. Data set 6 is topographical information such as terrain heights and clutter classes.

The measured data set 2 is processed with the site information data set 4 and the topographical information data set 6 in a path loss extraction step 8 to yield measurements of path loss in relation to location The path loss measurements are then used in an automatic regression procedure in a model optimisation step 10 to determine optimised coefficients for a chosen known propagation model 12, which may be of either empirical or physical type.

The resulting optimised propagation model 12 is then used to make predictions of the path loss at each of the mobile locations and also over a wider area representing the area over which the performance of the total system is required to be predicted and/or optimised.

The original path loss measurements are subtracted in a subtraction step 14 from the predictions at corresponding locations to yield the prediction errors. These are effectively the "shadowing" or "slow fading" components of the signal.

The shadowing is then analysed statistically in a shadowing parameter extraction step 16 to yield parameters which are representative of the area that has been tested. The derived parameters are then used in a shadowing generation step 18 to generate a set of shadowing predictions for the entire area of interest and the shadowing predictions are added to the model predictions for the area in a merge step 20. In contrast to conventional predictions which rely on the physical similarity of the prediction area to the wireless system which was originally used to derive the model, because the model predictions have zero mean error and minimised standard deviation due to the regression procedure, the resulting merged data then has very similar characteristics to measurements that would have been produced over the whole area.

At this stage, however, because the shadowing component is generated randomly, the predictions may not accord with the measurements. In a subsequent step, also within step 20, the predictions of the total path loss (including shadowing) are merged with the original measurements. If the measurements have been made with known negligible error, then the predictions are forced to fit the measurements precisely at the measured locations and the results are smoothly merged with the predictions consistent with known parameters of the measured shadowing. On the other hand, if the measurements have a known standard error, then this is used to create a weighted sum of the measurements and the predictions to ensure the end results maximises the prediction confidence.

If the measurements include multiple base stations, the predictions are performed for each of the base stations individually. The joint statistics of the shadowing for all pairs of base stations are extracted and these are used to ensure the statistics of the predictions are forced to be conformant to these joint statistics.

The final output in step 22 is a matrix of high-confidence path loss predictions for every base station site in the original measurement set. Additional base stations can be added at the same sites as the measurements without loss of confidence. Additional sites can also be added, but these will be subject to similar (but still reduced) errors as using conventional predictions.

Signal Measurements

The base station transmitter can transmit a continuous wave (CW) unmodulated signal or a modulated, potentially wideband, signal. The transmitter may therefore either be installed temporarily for the purpose of the measurement-based prediction of the present invention, or an existing transmitter at the site which is already part of a network to be analysed and optimised.

The transmit antenna radiation pattern is arbitrary, but accurate information will only be obtained from directions in which significant power is radiated. It is therefore best to employ an omnidirectional radiation pattern wherever possible. In the case of base stations situated on the rooftops of buildings or other locations where strong shadowing from the local environment is likely, a single omnidirectional antenna will not adequately represent the final site installation. In this case, several antennas with azimuthal directivity are used to span the horizontal plane. (typically 3 sector antennas with around 80 degree 3 dB beamwidth with main beam oriented at 120 degree intervals would be used, located at the edges of the building rooftop). Such antennas do not need to be separately fed: they are typically combined and fed by a single transmitter.

Several base station transmitters can be used simultaneously. They can be separated either by allocating a different frequency to each, or by transmitting a differing spreading code in the case of a spread-spectrum signal. In the case of frequency separation, the frequencies need only be close enough to share the same basic propagation characteristics. For example, typically median path losses increase approximately proportional to frequency to the power of 2.6 (i.e. L=K+26 log f, where L is the path loss in decibels, k is an arbitrary constant and f is the carrier frequency). The path loss thus varies only slowly and will be within 1 dB for frequencies occurring in a ratio 1:1.09. For example, measurements made at 2 GHz and 2.18 GHz can be regarded as equivalent for the purposes of the present invention. It is not necessary for the frequencies to be within the channel coherence bandwidth because no attempt is made to predict fast fading effects using the present invention.

The mobile receiver station takes samples of received signal strength as it moves. The sample rate should be sufficient to give a good representation of the local mean signal strength, that is it must meet a suitable criterion such as the known Lee sampling approach where at least 43 samples are taken in every 40 wavelength distance, to obtain an estimate of local mean within 1 dB of the true value for 95% confidence.

The raw signal strength measurements for base site i can be represented as:

$$P_{mr}^i = P_{LM} + P_F$$

where all quantities are in decibel stations, $P_{LM}$ is the mean local power received at a fixed distance from the site an $P_F$ is the fast fading (multipath) component. It is assumed the mobile measurements are adjusted to account for the mean effective gain of the mobile antenna and the feeder loss between the antenna and the receiver terminals, so that the measurements effectively represent a mobile station with 0 dBi antenna gain and 0 dB feeder loss. The raw measurements are filtered in known manner to remove the fast fading component and to produce estimates of the local mean signal:

$$P_m^i(x_m, y_m) = P_{LM}$$

The results are now considered to be a function of the co-ordinates of the mobile station $(x_m, y_m)$. The height $h_m$ of the mobile station relative to a suitable reference, such as mean sea level, is also required and may be collected using GPS or a similar standard positioning system. This results in a unique height $h_m(x_m, y_m)$ for each $(x_m, y_m)$ pair.

As an alternative to the above, the mobile station can transmit to several base station receivers. This ensures there is no variation of the results with frequency. In this event, it is required that all of the base station receivers store the signal strengths together with a corresponding time stamp, while the mobile station records its position against time. Following data collection, data from the base station sites and the mobile station are combined to yield signal versus position measurements which are equivalent to those which would have been measured by the first-mentioned scheme. This alternative scheme relies on the reciprocity of the propagation channel, which is known to be a good assumption.

The measurements will usually require some processing at this stage to ensure their integrity. Such processing will depend on the collection system used, but is a simple matter for the skilled person and will typically include:
  removal of points with very low signal strength where the receiver noise floor will limit accuracy;
  removal of points with high signal strength where the receiver may be operating in a strongly non-linear region;
  adjustment of the recorded power values to account for the accurate calibration of the signals reported by the receiver; and
  removal of points where recorded position information is invalid.

Site Information

As a minimum the following information is required for the or each of the base sites used in the measurements:
  the site location $(x_s^i, y_s^i)$;
  the height of the radiation centre of the transmit antenna, $z_s^i$;
  the radiation pattern of the transmit antenna, $G^i(\theta, \phi)$ [decibels relative to an isotropic antenna, dBi], where the angles $\theta$ and $\phi$ are the azimuth and elevation angles relative to the radiation centre of the antenna; and
  the forward power measured at the terminals of the transmit antenna, $p^i$ [dBW].

The radiation pattern includes the bearing angle and downtilt angle of the antenna relative to the x, y co-ordinates. Antenna radiation patterns are typically available from manufacturers as measured on two cuts (usually the horizontal and vertical planes). These cuts require to be interpolated by any standard technique well known to the skilled person so that the radiation pattern can be predicted for any angle.

Terrain and Clutter Information

As a minimum, it is required that the height of the terrain over the entire prediction area is available, denoted h(x,y). Typically, this height is available at a number of discrete locations at a fixed interval of, say, 50 m. Greater accuracy may be achieved if additionally a classification of clutter into a number of discrete classes is available, denoted C(x,y).

Path Loss Extraction

The filtered received powers and the site terrain information are used to extract the path loss for each mobile station location and for each site, as follows:

$$L_T^i(x_m, y_m) = P^i + G(\theta_m, \phi_m) - P_m^i(x_m, y_m)$$

Here $(\theta_m, \phi_m)$ indicates the angles at which the mobile location $(x_m, y_m)$ is viewed from the radiation centre of the base antenna. For best accuracy, these should be calculated by assuming propagation takes place along the great circle path, that is the shortest path between the base site and the mobile station taking into account the curvature of the surface of the Earth.

Subsequent analysis assumes that the total path loss $L_T^i$ can be decomposed into two portions, one a distance dependent component $L^i$ which is predictable with high accuracy using an optimised model, and a shadowing component $S^i$ which is characterised statistically, but for which accurate values are available everywhere on the mobile route. Thus:

$$L_T^i(x_m,y_m)=L^i(x_m,y_m)+S^i(x_m,y_m)$$

Model Optimisation

The path loss model is now optimised using the measurements for each site. The detailed procedure will depend on the model applied and can readily be adapted by the skilled person without the need for invention. For example, using the simple model:

$$L^i(x_m, y_m)=A+B\log d_m+L_d^i$$

where $d_m$ denotes the distance between the $i^{th}$ site and the measured mobile locations (ideally along the great circle path). A regression procedure is then used to find the values of A and B which set the mean error to zero and minimise the standard deviation of the error. The procedure is applied to find the values separately for each clutter category. The values of the terrain diffraction loss $L_d^i$ can be found using any standard diffraction algorithm. It should be noted that, in contrast to the conventional approach, coefficients are found separately for every site thereby ensuring an optimum model is available to reflect the particular characteristics of each site.

Apply Optimised Model

The optimised models found from the previous procedure are now applied for all the sites throughout the desired prediction area, yielding values of predicted path loss with high accuracy, including locations where no measurements were taken.

This gives values of predicted path loss for all sites at all co-ordinates (x,y), denoted $L_p^i(x,y)$.

Extract Shadowing

The predicted path loss values at the measurement points are now used to extract the values of shadowing:

$$S^i(x_m,y_m)=L_T^i(x_m,y_m)-L_P^i(x_m,y_m)$$

Extract Shadowing Parameters

The shadowing values for each site at the measurement locations are now analysed to find their statistical properties. These properties are divided into two categories, first order and second order statistics. In some cases it is acceptable to characterise the shadowing using only the first order statistics, but best results are obtained using both the first order and second order sets.

First Order Shadowing Statistics

These include mean value, standard deviation and probability density function (pdf).

Mean value is defined as:

$$\mu^i=E[S^i(m_m,y_m)]$$

where E[.] denotes the expectation or mean value of the quantity in square parentheses. If the model coefficients have been properly extracted, the mean should generally be zero.

Standard deviation is defined as:

$$\sigma^i(x_m,y_m)=\sqrt{E[(S^i(x_m,y_m))^2]-(\mu^i)^2}$$

and is often known as the local variability of the shadowing.

Figure 2:
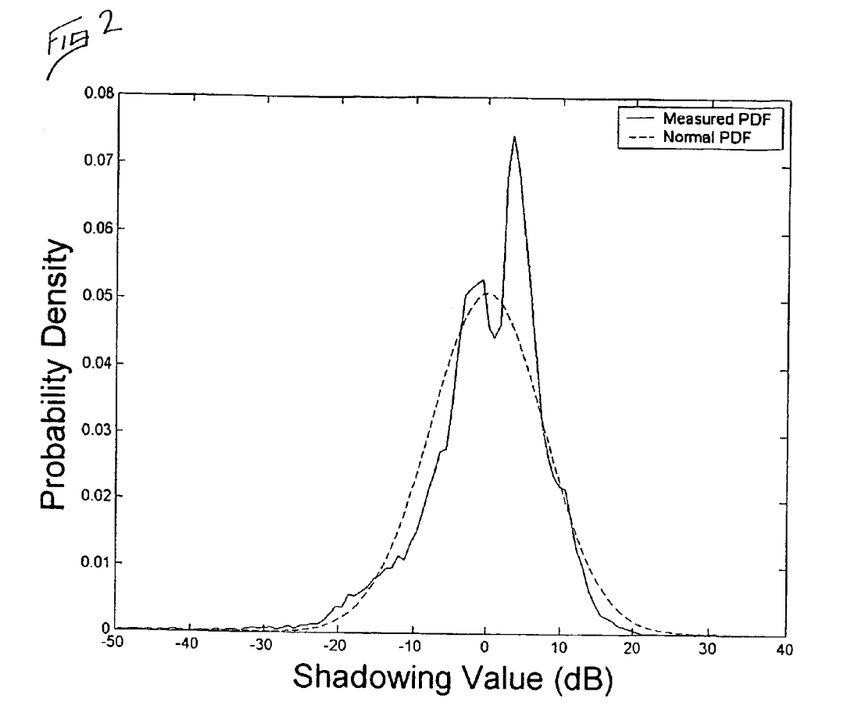
FIG. 2 is a graph employed in the determination of first order shadowing statistics and showing a comparison of a normal probability density function with a measurement probability density function having the same mean and standard deviation.

With regard to the probability density function (pdf), it is usually assumed a priori that the shadowing values in decibels follow a normal distribution (i.e., the underlying power values are lognormally distributed). This assumption is tested using the measurement data and a goodness-of-fit test (such as the Kolmogorov-Smirnoff test) at an appropriate confidence level. If the test indicates a poor fit and the number of measurements is sufficient to have high confidence in the measured pdf, then the measured pdf is used for subsequent shadowing generation. FIG. 2 shows an example of a situation where the measurement pdf is compared with a normal pdf with the same mean and standard deviation. Reasonable agreement is obtained in this case, but there is evidence of bimodal (two-peaked) distribution so highest accuracy would be obtained using the measured pdf directly.

Second Order Shadowing Statistics

Figure 3:
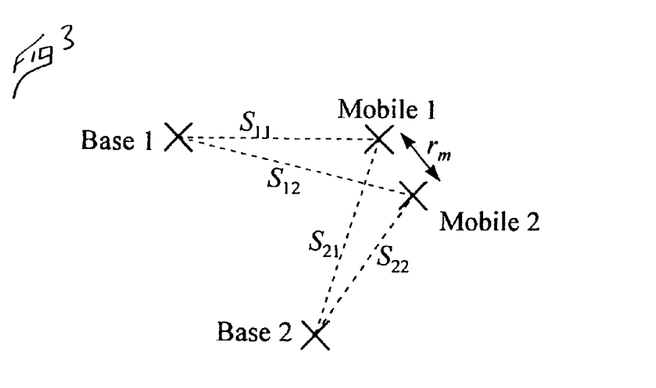
FIG. 3 is a diagram illustrating the relative dependence of base sites and mobile locations.

FIG. 3 shows each of the paths between two example base sites and a pair of mobile locations together with the value of shadowing associated with that path. Each of the four shadowing values $S_{11}$, $S_{12}$, $S_{21}$ and $S_{22}$ are assumed to be zero-mean normal random variables when expressed in decibels. However, they are not independent of each other, since the four paths may include many of the same features which affect propagation.

Two Types of Correlation are Distinguished:

Auto-correlation in the form of correlations between two mobile locations, receiving signals from as single base station, such as between $S_{11}$ and $S_{12}$ or between $S_{21}$ and $S_{22}$. These correlations represent the auto-correlation of the shadowing experienced by a single mobile station as it moves through a distance $r_m$ defined by:

$$\rho_s(r_m) = \frac{E[S_{11}S_{12}]}{\sigma_1\sigma_2}$$

Figure 4:
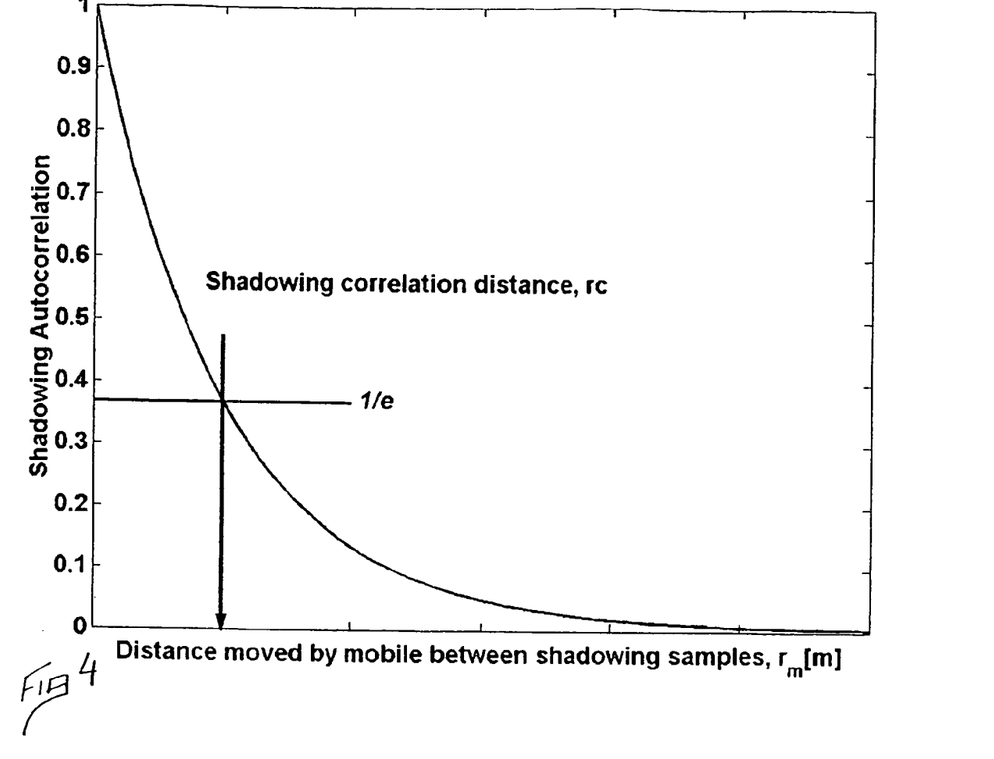
FIG. 4 is a graph illustrating a shadowing auto-correlation function.

The expectation is taken over all mobile measurement locations for every pair of sites which produced valid measurements at these locations. The resulting function can take any form, and the measured function can be used directly for shadowing generation. More usually some form will be assumed, such as the negative exponential model shown in FIG. 4 for which a single parameter, the correlation distance $r_c$, is estimated from the measurements.

Cross-correlation in the form of correlations between two base station locations received at a single mobile location, such as between $S_{11}$ and $S_{12}$ or between $S_{12}$ and $S_{22}$. These are cross-correlations defined by:

$$\rho_c\left(\frac{d_1}{d_2},\Phi\right) = \frac{E[S_{11}S_{12}]}{\sigma_1\sigma_2}$$

The cross-correlation is considered to be a function of two variables, $d_1/d_2$, which is the ratio of the distances between the base sites and the measurement location, and $\phi$, which is the angle between the two shadowing paths.

General Statistics

For both first order and second order statistics the parameters can be estimated for all sites and for the entire measurement area or they can be sub-divided into clutter classes or sub-groups of sites. The choice depends on the density of the measurements available and the uniformity of the prediction area: sub-dividing the results enables the predictions better to track variations in the environment, but reduces the number of measurements available in each sub-division to provide an accurate estimation of the shadowing parameters.

Generate Shadowing

Two approaches can be used for generating the shadowing matrix (shadowing over the user-defined prediction area): a correlated method and a random method. The choice of the method will depend on the number of sites that are to be predicted and the number of sites at which measurements are available. A hybrid approach using both correlated and random approaches is also possible, which allows sites at which measurements are not available to be accurately predicted. This uses the cross-correlation properties of the measurements to create predictions for the new site which have consistent correlations with the available measurements.

Correlated Shadowing

The correlated shadowing approach consists of using the measured shadowing $$S^i(x_m,y_m)=L_T^i(x_m,y_m)-L_P^i(x_m,y_m)$$

as input into a linear spatial prediction model. Since the shadowing is distributed in space rather than time, it is appropriate to rely on a geostatistical method (such as Kriging) for populating the matrix.

Using this approach ensures that predictions at locations coinciding with measurement points will be highly weighted by the locally measured shadowing. This puts a greater emphasis on the density of measurements within the prediction area.

This approach is particularly appropriate for single site predictions where measurements are available from a test site located at or near the planned site. The type of output from this method will be very similar to the example shadowing matrix shown in FIG. 6.

Random Shadowing

Figure 5:
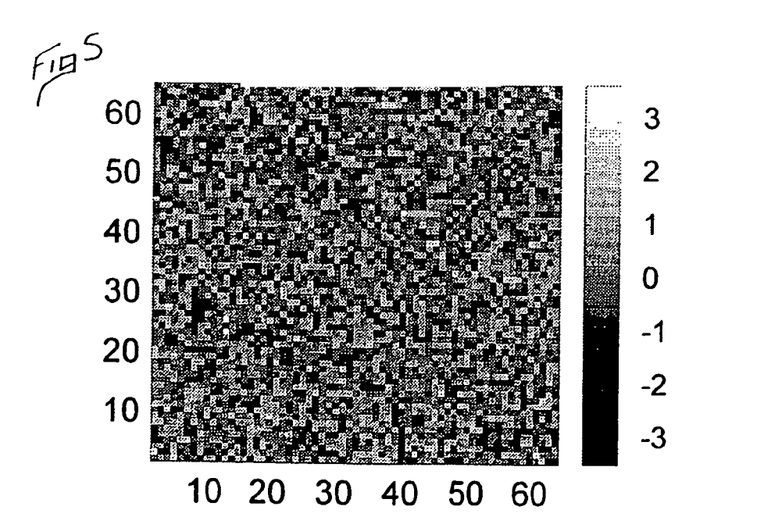
FIG. 5 is a representation of shadowing values generated in accordance with first order statistics.

Shadowing values are now generated randomly for every base site and every position across the prediction area in accordance with the first order statistics previously derived. The shadowing values are shown in FIG. 5.

Figure 6:
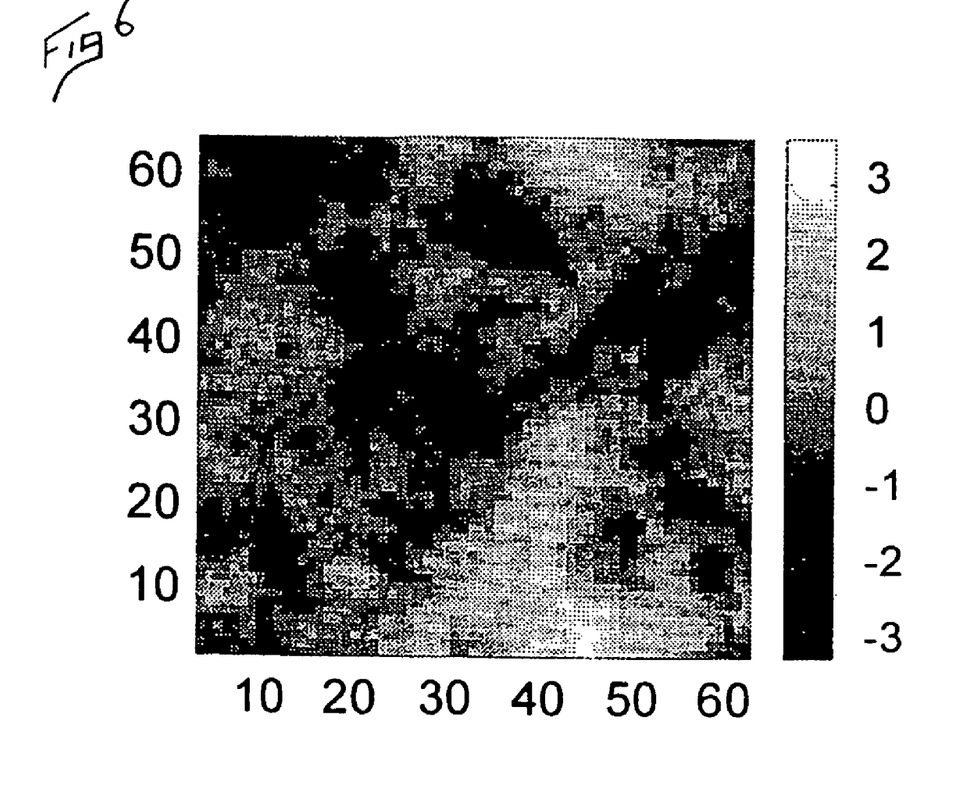
FIG. 6 is a representation of shadowing values generated in accordance with both first order and second order statistics.

The generated values are filtered-within the values for each site to produce values which are consistent with both the first order and second order statistics and an example for one site is shown in FIG. 6. One scheme for accomplishing the filtering is known from Fiacco et al, "Measurement and Modelling of Shadowing Crosscorrelation at 2 GHz and 5 GHz In Indoor Environments", AP2000 Millennium Conference on Antennas & Propagation, Davos, Switzerland, Apr. 9–14, 2000. However, other schemes are possible.

Conventionally, filtering has been accomplished using only a small number of sites to extract parameters and then used "blindly" on other sites. In accordance with the present invention parameters are available for the actual sites involved in the prediction.

The result is a set of generated shadowing values $S_g^i(x,y)$ for every site over the entire prediction area.

Merge Measurements and Predictions

The predicted path loss and shadowing values over the whole prediction area are now summed to yield generated values of the total path loss:

$$L_{Tg}^i(x,y)=L_P^i(x,y)+S_g^i(x,y)$$

However, although the procedure to this point ensures that the generated values have properties consistent with those measured, the specific values are not guaranteed to match the measurements at the measurement locations in the case of the random shadowing method.

In this case, if the measurements are considered to be of very high accuracy, they can be used to overwrite the generated values at the measurement locations:

$$L_{Tg}^i(x_m,y_m)\Leftarrow L_T^i(x_m,y_m)$$

where left ⇐right denotes replacement of the left value with the right value. Alternatively, if the measurements are themselves subject to errors due to noise and/or location errors, the generated values can be replaced as follows:

$$L_{Tg}^i(x_m,y_m)\Leftarrow w_1\times L_{Tg}^i(x_m,y_m)+w_2\times L_T^i(x_m,y_m)$$

where $w_1$ and $w_2$ are weighting factors determined to maximise the accuracy of the final result taking into account the known inaccuracies of the measurements and the generated values.

Finally, the replacement/weighting operation described above may affect the auto-correlation properties of the generated values close to the measurements. This can be corrected by smoothing the generated values with a filter which matches the auto-correlation properties of the measurements.

The results following this procedure are the measurement-based predictions of total path loss for the entire prediction area.

Measurement-based Optimisation

Figure 7:
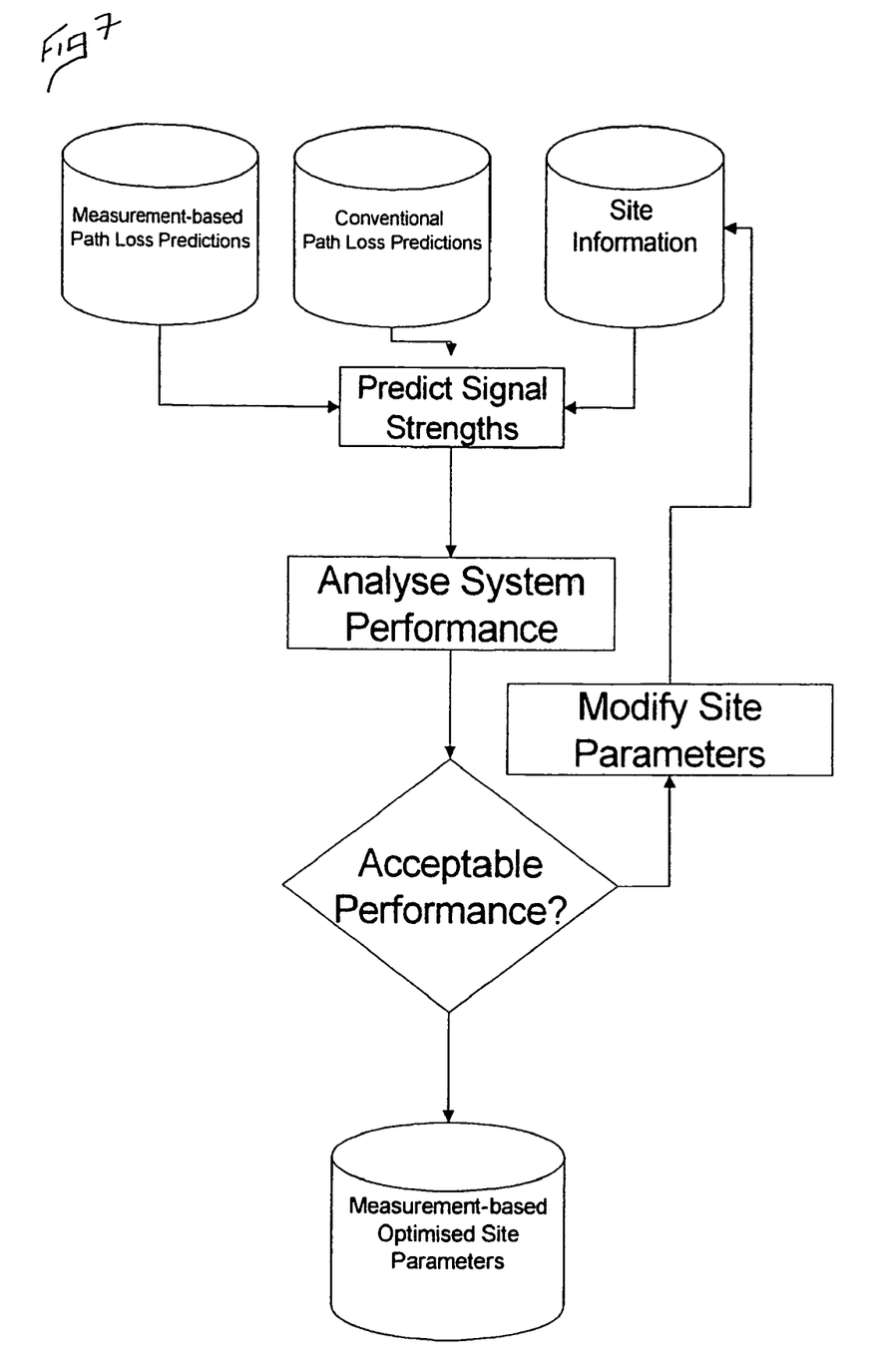
FIG. 7 is a flow diagram schematically illustrating a method of measurement-based optimisation according to the present invention.

Once the measurement-based prediction of path loss has been created, the prediction can be used at the heart of a measurement-based optimisation of the system performance as illustrated in FIG. 7.

The proposed site parameters, located at the same locations as the original test sites, are used together with the measurement-based predictions to predict signal strengths over the prediction area. It should be noted that, although the sites (and preferably the antenna heights) should be the same, the other parameters need bear no relationship to the original measurement parameters. For example, an initial omni-directional measurement can be used via the measurement-based prediction to represent a 3-sector arrangement with any powers, bearing and downtilts. The predicted signal strengths are used to simulate the system performance by calculation of intermediate parameters such as handover boundaries, carrier-to-interference ratios and coverage probabilities. In a sophisticated simulation the dynamics of mobile users and of algorithms such as power control and resource management can be included in the simulation.

If the resulting site performance is unacceptable the site parameters can be modified and used to repeat the simulation without the need to re-calculate the measurement-based prediction. The process is continued until acceptable system performance is obtained.

The simulation and optimisation process is essentially the same as that used with conventional predictions except that in the case of the present invention the measurement-based prediction provides far greater confidence in the results than would conventionally be the case.

Extensions and Variations

It will be appreciated the measurement-based prediction of the present invention can be modified in a number of ways without departing from the scope of the invention.

For example, if, at the optimisation stage it is found that acceptable performance cannot be obtained with the measured sites, or if additional sites are not available, sites can be added using conventional path loss predictions using the optimisation procedure illustrated in FIG. 7. These additional sites will not, however, benefit from the full measurement-based prediction accuracy.

The measurement-based prediction approach described hereinabove uses an assumption that the propagation channel, characterised via the total path loss, and the antenna characteristics, characterised via the antenna radiation patterns, are entirely separable. This assumption is valid if the major influences on propagation are situated along the great circle path and/or if the measurement antenna patterns are broadly similar to those used in the measurement-based optimisation. However, in very strongly scattering environments, such as for in-building systems and for microcells, this assumption is likely to be less valid. In these cases the same basic scheme can be applied, but it is then correspondingly more important to use antennas with a similar radiation pattern to those applied in the real system.

The measurement-based prediction technique has been illustrated above with reference to one generic propagation model, but any model having tunable parameters can equally be applied. For example, for indoor applications the model could be a known wall and floor model (see the book by Saunders), with the parameters to be tuned being the loss per floor and the loss per wall and the path loss exponent, and the clutter classes being represented by the number of walls and floors being penetrated by the direct path.

The reliability of the measurement-based prediction will depend on how many measurements are available. In the extreme case of measurements being available everywhere, measurement-based prediction and subsequent measurement-based optimisation can be regarded as identical to reality. If no measurements are available, measurement-based prediction and subsequent measurement-based optimisation should be at least as good as the conventional planning process.

In the case where shadowing is randomly generated, assuming the random process used is seeded differently for each run then slightly different results will be obtained for each measurement-based prediction, even with the same input data. In order to confirm the significance of this effect, measurement-based prediction and subsequent optimisation should be run several times to estimate the spread of the system performance parameters. Alternatively, the shadowing generation step can be replaced with an analytical formulation of the probability of the total path loss being in any range—this is available because the underlying probability density function is known. These probabilities are then used within the measurement-based optimisation to estimate the statistics of system performance. When calculating the cumulative effect of multiple sites at a given mobile location (or vice versa) this will usually involve the use of a technique for estimating the statistics of a sum of shadowing components, for example as described by Schwartz et al in "On the distribution function and moments of power sums with lognormal components", *Bell Sys. Tech. J.*, vol. 61, no. 7, pp. 1441–1463.

The invention claimed is:

1. A measurement-based prediction method for radiation path loss over a predetermined area to create an optimized path loss model, comprising the steps of:
   determining a received signal strength at at least one first station resulting from a transmission of known properties from at least one second station, the first and second stations having known locations;
   determining radiation path loss data on the basis of the received signal strengths and topographical information of the predetermined area;
   analysing the determined radiation path loss data to determine coefficients for a radiation propagation model;
   applying the radiation propagation model to generate first predicted radiation path loss data at each of the locations of the first stations and over the predetermined area and to create a first path loss model;
   determining shadowing values on the basis of differences between the received signal strength and the first predicted radiation path loss data at each of the locations of the first stations;
   analysing the shadowing values to yield shadowing parameters representative of the predetermined area; and
   generating shadowing predictions over the predetermined area on the basis of the shadowing parameters and combining such shadowing predictions with the first predicted radiation path loss data to generate second predicted radiation path loss data over the predetermined area and to create a second, optimized path loss model.

2. A prediction method according to claim 1, wherein the topographical information includes terrain heights.

3. A prediction method according to claim 1, wherein the topographical information includes clutter classes.

4. A prediction method according to claim 1, wherein the transmission properties are employed in determining the radiation path loss data.

5. A prediction method according to claim 1, wherein the transmission properties include transmission power.

6. A prediction method according to claim 1, wherein the transmission properties include antenna radiation pattern.

7. A prediction method according to claim 1, wherein the transmission properties include antenna height.

8. A prediction method according to claim 1, wherein the determined radiation path loss data is analysed by an automatic regression procedure.

9. A prediction method according to claim 1, wherein a single second station and a single first station are provided.

10. A prediction method according to claim 9, wherein one of the stations is movable.

11. A prediction method according to claim 1, wherein a single second station and multiple first stations are provided.

12. A prediction method according to claim 1, wherein multiple first and second stations are provided, the second stations transmitting at different frequencies.

13. A prediction method according to claim 12, wherein the determined radiation path loss data is analysed to determine separate coefficients for each second station.

14. A prediction method according to claim 1, wherein-the shadowing parameters are determined on the basis of the mean of the shadowing values.

15. A prediction method according to claim 1, wherein the shadowing parameters are determined on the basis of the standard deviation of the shadowing values.

16. A prediction method according to claim 1, wherein the shadowing parameters are determined on the basis of the probability density function of the shadowing values.

17. A prediction method according to claim 16, wherein a goodness-of-fit test to a parameterised distribution is employed.

18. A prediction method according to claim 17, wherein the parameterised distribution is lognormal.

19. A prediction method according to claim 1, wherein the shadowing parameters are determined on the basis of an auto-correlation between the received signal strengths and the distance between first stations.

20. A prediction method according to claim 1, wherein the shadowing parameters are determined on the basis of a cross-correlation between the received signal strengths as a function of the ratio of distances between first and second stations and the angle between the paths between the first and second stations.

21. A prediction method according to claim 1, wherein the shadowing predictions are generated randomly on the basis of the shadowing parameters and filtered according to determined shadowing (correlation) values.

22. A prediction method according to claim 1, and including the step of merging the determined radiation path loss data with the second predicted radiation path loss data to generate third predicted radiation path loss data over the predetermined area.

23. A prediction method according to claim 22, wherein the third predicted radiation path loss data is determined by summing the second predicted radiation path loss data and the shadowing predictions.

24. A prediction method according to claim 22, wherein the third predicted radiation path loss data is determined by substituting at locations corresponding to the first stations data determined from the received signal strength.

25. A prediction method according to claim 24, wherein the third predicted radiation path loss data which is not substituted is filtered to smooth the data.

26. A prediction method according to claim 22, wherein the third predicted radiation path loss data is determined by substituting at locations corresponding to the first stations a weighted average of the summed data and data determined from the received signal strength.

* * * * *